E. R. COBB.
COMBINED TRUCK BODY AND RACK.
APPLICATION FILED AUG. 9, 1919.
1,360,889.
Patented Nov. 30, 1920.
4 SHEETS—SHEET 1.
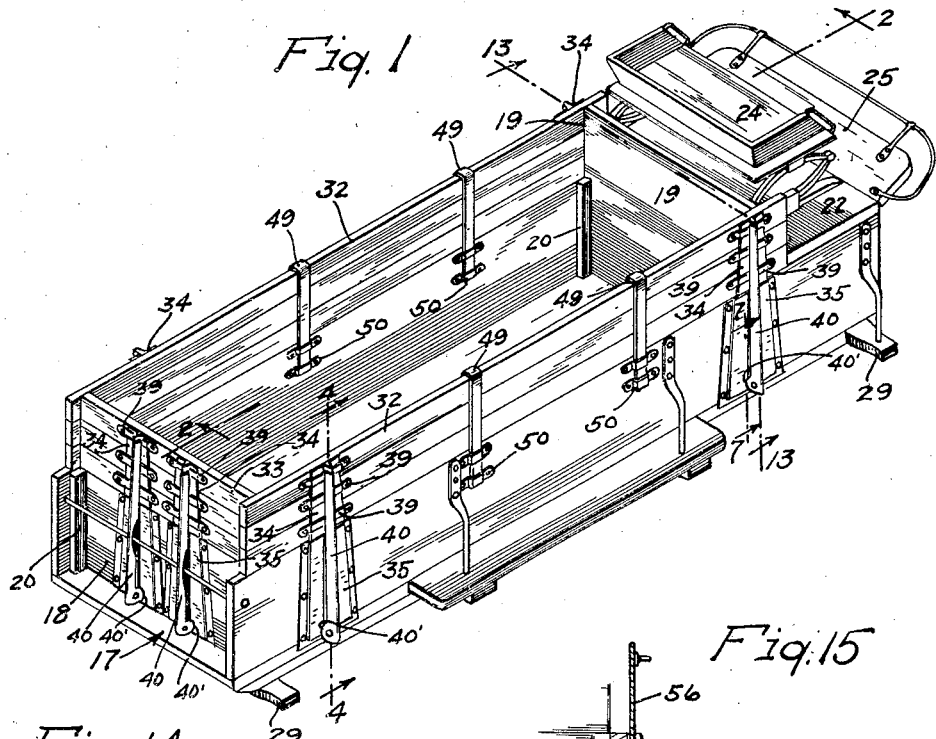
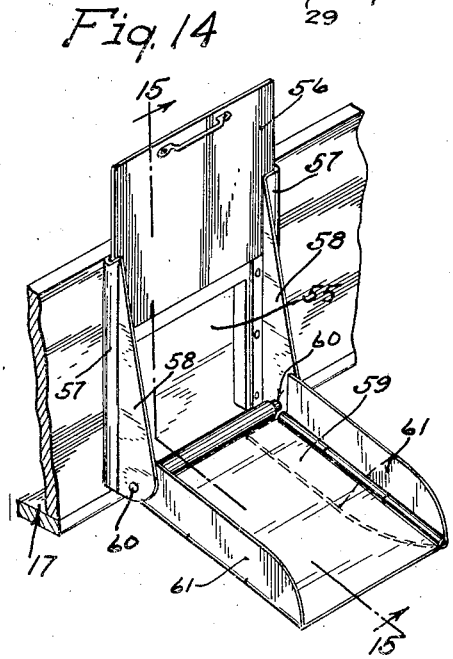
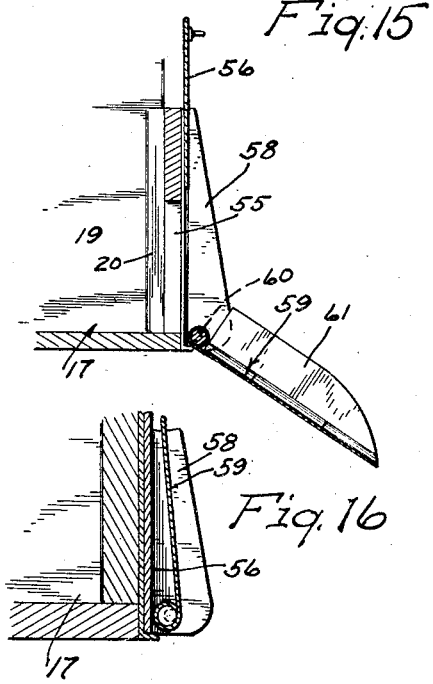
INVENTOR
Edward R. Cobb
BY HIS ATTORNEYS

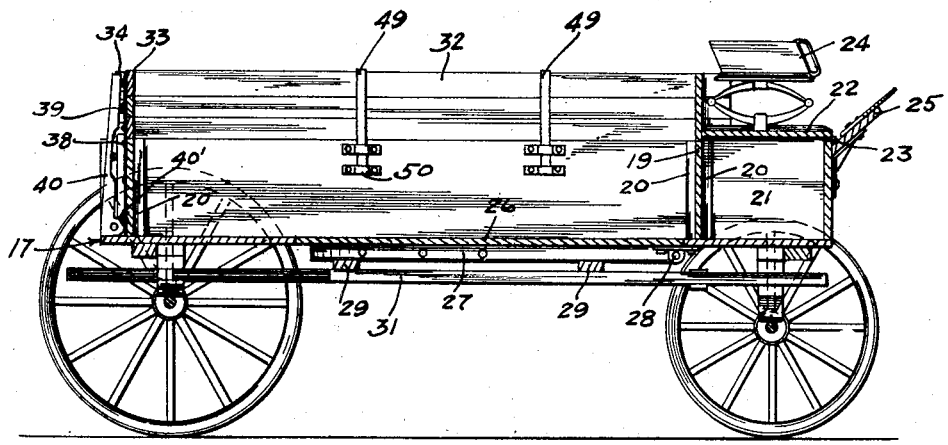
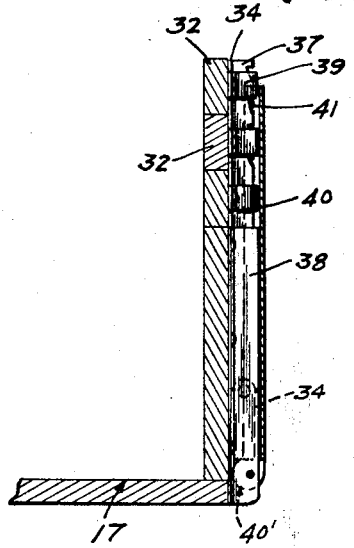
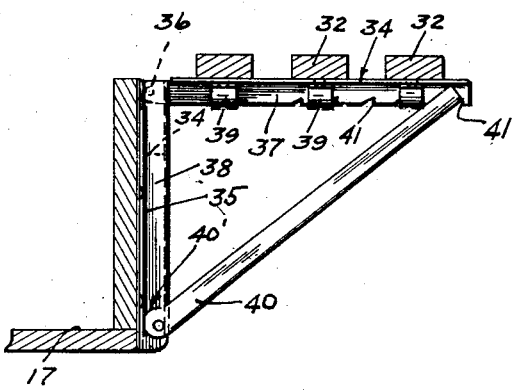

E. R. COBB.
COMBINED TRUCK BODY AND RACK.
APPLICATION FILED AUG. 9, 1919.
1,360,889.
Patented Nov. 30, 1920.
4 SHEETS—SHEET 3.
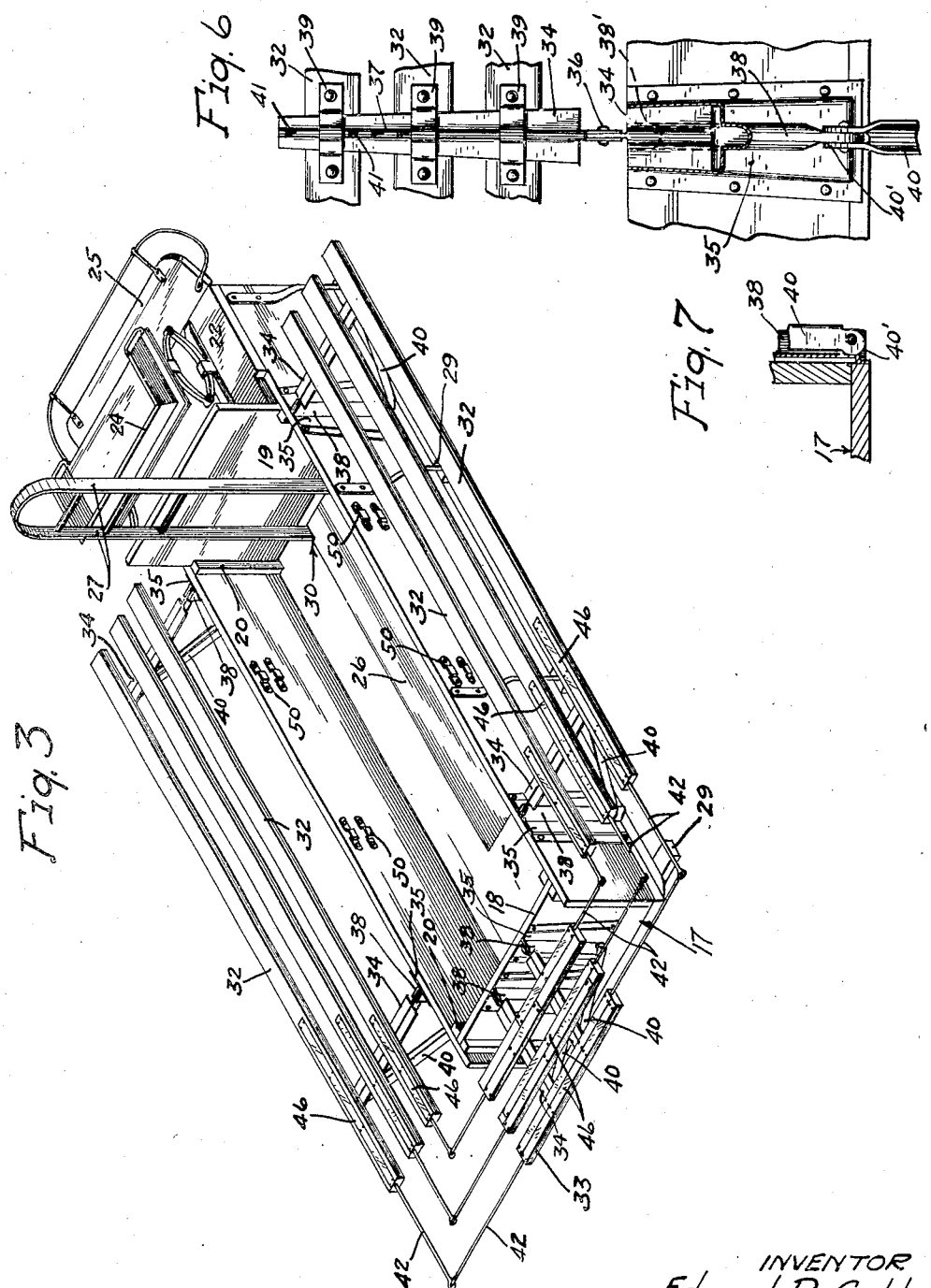
INVENTOR
Edward R. Cobb
BY HIS ATTORNEYS E. R. COBB.
COMBINED TRUCK BODY AND RACK.
APPLICATION FILED AUG. 9, 1919.
1,360,889.
Patented Nov. 30, 1920.
4 SHEETS—SHEET 4.
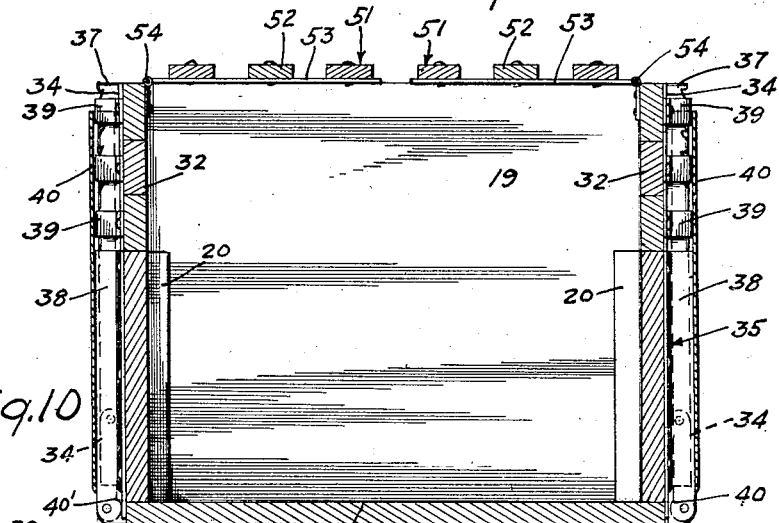
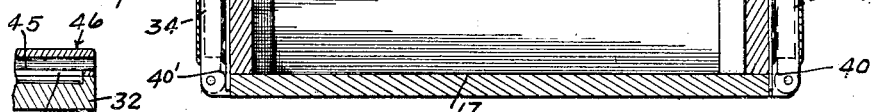
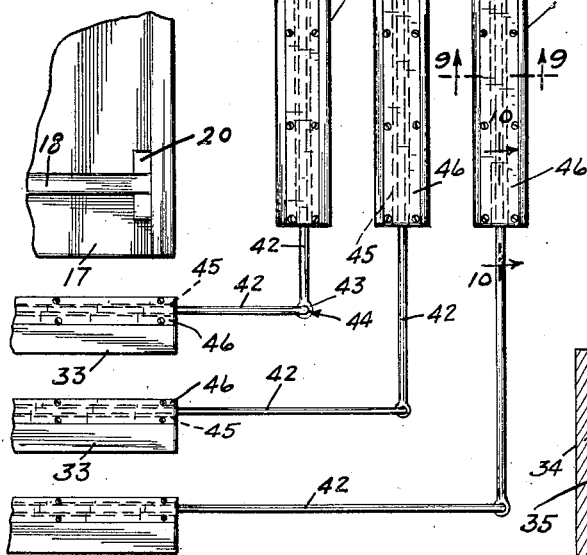
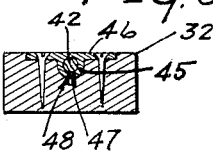
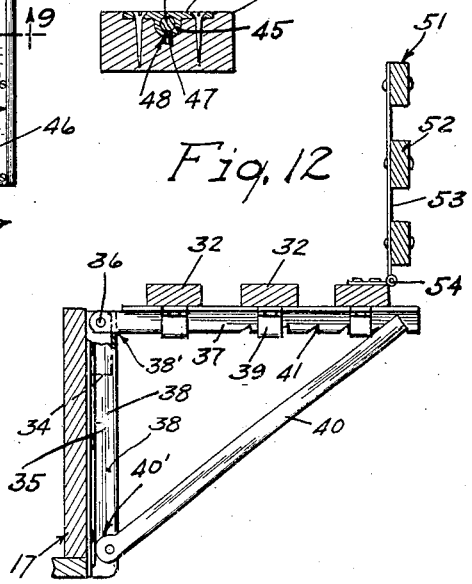
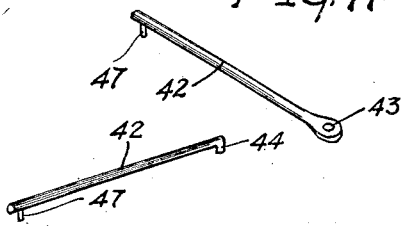
INVENTOR
Edward R. Cobb
BY HIS ATTORNEYS

UNITED STATES PATENT OFFICE.

EDWARD R. COBB, OF MINNEAPOLIS, MINNESOTA.

COMBINED TRUCK BODY AND RACK.

1,360,889.   Specification of Letters Patent.   Patented Nov. 30, 1920.

Application filed August 9, 1919. Serial No. 316,479.

*To all whom it may concern:*

Be it known that I, EDWARD R. COBB, a citizen of the United States, residing at Minneapolis, in the county of Hennepin and State of Minnesota, have invented certain new and useful Improvements in Combined Truck Bodies and Racks; and I do hereby declare the following to be a full, clear, and exact description of the invention, such as will enable others skilled in the art to which it appertains to make and use the same.

My invention relates to improvements in combined truck bodies and racks. The primary object of the invention is to provide simple, inexpensive and efficient means for attaching a rack to the body or box of a farm wagon or truck, whereby the rack may be readily adjusted in respect to the wagon box to carry grain, stock, hay and the like.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Figure 1 is a perspective view showing one adjustment of the invention;

Fig. 2 is a longitudinal section taken on the line 2—2 of Fig. 1;

Fig. 3 is a perspective view showing another adjustment of the invention;

Fig. 4 is a fragmentary transverse vertical section taken on the line 4—4 of Fig. 1 on an enlarged scale;

Fig. 5 is a view corresponding to Fig. 4 with the exception that the rack is adjusted as shown in Fig. 3;

Fig. 6 is a front side elevation of the parts shown in Fig. 4 with the exception that the rack is turned into a vertical position;

Fig. 7 is a detail view taken on the line 7—7 of Fig. 1;

Fig. 8 is a fragmentary plan view of the rear righthand corner of the box and rack as adjusted in Fig. 3;

Fig. 9 is a detail view in section taken on the line 9—9 of Fig. 8;

Fig. 10 is a detail view in longitudinal section taken on the line 10—10 of Fig. 8;

Fig. 11 is a perspective view of one of the pairs of rack corner rods separated and removed from the bars;

Fig. 12 is a view corresponding to Fig. 5 with the exception that there is added thereto an adjustable rack extension;

Fig. 13 is a view in transverse vertical section taken on the line 13—13 of Fig. 1 on an enlarged scale and also showing the rack extension folded to form a cover;

Fig. 14 is a fragmentary perspective view of the wagon box having in one side a door-equipped coal and grain chute;

Fig. 15 is a transverse vertical section taken on the line 15—15 of Fig. 14; and Fig. 16 is a view corresponding to Fig. 15 with the exception that the door is closed and the chute raised.

The numeral 17 indicates a standard farm wagon box having an end gate 18. A transverse partition 19 is removably mounted between pairs of guides 20 secured to the sides of the box 17, and which partition separates from said box at the front end thereof a relatively small storage compartment 21 having a cover 22. This cover 22 is hinged at 23 to the front end of the box 17 and has secured thereto a spring-supporting seat 24. A foot rest 25 is secured to the front end of the box 17 and projects outward and upward from the cover 22.

The bottom of the box 17 is provided with a removable section 26, under which normally lies a ladder 27 for the hayrack, as will presently appear. This ladder 27 is hinged at 28 to the bottom of the box 17 and when not in use rests on certain of the transverse sills 29 of the box 17. When the ladder 27 is raised, as shown in Fig. 3, the same extends through notches 30 in the front end of the bottom section 26 and is securely held by the bottom of the box 17. In Fig. 2, the box and rack are shown on the running gear 31 of an ordinary farm wagon or truck.

The rack attachment comprises two side sections and a rear end section, the former of said sections each includes three longitudinally extended bars 32 and the latter of said sections includes a corresponding number of transverse bars 33. Each of the rack sections also includes two posts 34 supported in pockets 35. The pockets 35 for the side posts 34 are permanently secured by suitable means, such as bolts, to the outer faces of the sides of the box 17 and the end pockets 35 are likewise secured to the outer face of the end gate 18. Each post 34 is upwardly tapered at its edge and its pocket 35 is correspondingly tapered to permit a limited endwise movement of said post therein, but prevents said post from being entirely lifted or removed from its pocket. Each post 34 is made in a top section and a base section connected by a pivot joint 36 arranged to permit said top section, which is relatively long, to be folded outward.

The posts 34 are provided on their outer faces with centrally located longitudinal ribs 37, the outer edges of which are upwardly tapered. The pockets 35 also have their outer faces outwardly folded to form channels 38 in which the ribs 37 slidably work. The side bars 32 and the end bars 33 are adjustably secured to the upper sections of the posts 34 by keeper brackets 39. These keeper brackets 39 are bolted at their ends to the outer faces of the bars 32 and 33 and have on their inner faces contours which closely engage the upper sections of the posts 34 and hold the inner faces thereof against the adjacent faces of said posts. The width of the keeper brackets 39 is such as to limit the sliding movement of the bars 32 and 33 on the posts 34 and thereby act as stops to evenly space said bars edgewise from each other, as best shown in Fig. 6.

To support the upper sections of the posts 34 in horizontal out-turned positions, as shown in Fig. 5, or in different oblique positions above said horizontal positions, there is pivoted to the lower end of each pocket channel 38 an upwardly extended arm 40 that is channel-shape in cross section. The upper ends of the arms 40 are arranged to engage longitudinally spaced ratchet teeth 41 in the ribs 37, as stops, to hold the upper sections of the posts 34 in different adjustments and the side flanges of said arms embrace the ribs 37 to hold the post against lateral separation therefrom. When the upper sections of the posts 34 are turned into upright positions, the arms 40 are also turned upright and cover the ribs 37, as best shown in Fig. 4. To yieldingly hold the arms 40 in upright positions, there is formed on the sides of their lower ends eccentric surfaces 40' arranged to frictionally engage the pockets 35.

To adjust the rack to form an extension of the box 17 and thereby increase the depth thereof, the side and end sections of said rack are first turned upright, as shown in Fig. 6, to permit the posts 34 to be moved downward in the pockets 35 and thereby carry their joints 36 into said pockets. With the post joints 36 in the pockets 35, the upper sections of said posts are rigidly held in upright positions with the bars 32 and 33 in the same vertical planes with the sides and ends of the box 17, respectively. When the posts 34 are moved downward in the pockets 35, the lowermost rack bars 32 and 33 engage the upper edges of the box 17 and, when thus stopped, said posts continue to move downward through the keeper brackets 39 on said lowermost bars. This movement of the posts 34 through the keeper brackets 39 of the lowermost bars 32 and 33 will carry the intermediate of said rack bars into engagement with the lowermost of said bars. Further downward movement of the posts 34 will move through the keeper brackets 39 on the lower and intermediate rack bars and thereby carry the uppermost rack bars into engagement with the intermediate rack bars. It will thus be seen that the rack bars 32 and 33 rest the one upon the other and on the upper edges of the sides and end gate of the box 17, as shown in Fig. 1, to afford a closed extension of said box 17. It will also be noted that the partition 19 is of the same height as the rack bars 32 and 33.

When the sections of the rack are adjusted to form a hayrack, as shown in Figs. 3, 8 and 12, the open rear corners thereof are closed by means of two-part rods 42 which detachably connect the rear ends of the side bars 32 to the adjacent ends of the end bars 33. The members of each rod 42 are flexibly and detachably connected by forming in one section of the rod an eye 43 adapted to receive a depending finger 44 on the other of said sections. Each section of corner rods 43 is mounted in a tubular body member 45 formed on the under side of a plate 46 which in turn is set into the upper face of the respective rack bar, as shown in Fig. 9. These rods 42 are free to move endwise in the body members 45, and to prevent the same from becoming detached therefrom, said rods have on their inner ends depending fingers 47 which work in longitudinal slots 48 formed in the under faces of said body members and in the rack bars.

To assist the side posts 34 in holding the respective rack bars 32 against lateral movement when forming vertical extensions of the box 17, there is provided U-shaped members 49 arranged to straddle said rack bars and sides of said box with their lower ends detachably held by keeper brackets 50 on the inner and outer faces of the sides of the wagon box 17.

To change the rack from a body extension, as shown in Figs. 1 and 2, to a hayrack, as shown in Figs. 3 and 8, the posts 34 are lifted in their pockets 35 until their joints 36 are out of said pockets. The upper sections of the post 34 are then swung outward into horizontal positions and their outer ends supported on the arms 40. The jointed ends of upper sections of the posts 34, at this time, are supported in notches 38' formed in the upper ends of the ribs 38. The bars 32 and 33 are then moved on the posts 34 until stopped by frictional engagement with their keeper brackets 39 which are arranged to properly equally space said bars in respect to each other.

Referring now to the modification shown in Figs. 12 and 13, there is provided rack extensions 51 comprising a plurality of edgewise spaced bars 52 secured to bars 53 hinged at 54 to the uppermost rack bars 32 and 33. These rack extensions 51 may be turned vertically upward, as shown in Fig. 12, to afford sides for the hayrack, and held by any suitable means or they may be used as cover sections, as shown in Fig. 13, when stock is carried in the box.

Referring now to the construction shown in Figs. 14, 15 and 16, the numeral 55 indicates a door-opening in one of the sides of the box 17. This door-opening 55 is normally closed by a door 56 mounted for vertical sliding movement in channel guides 57 secured to the outer face of the box 17, at the vertical edges of said door-opening. The outer flanges of the guides 57 have integrally formed therewith outwardly turned side flanges 58 which are tapered upward from their lower ends. A coal or grain chute 59 is hinged at 60 to the lower ends of the flanges 58. By reference to Fig. 16, it will be noted that the hinge 60 is in the form of an eccentric arranged to engage the door 56 when closed and thereby frictionally hold the chute 59 in a raised position. Side members 61 are hinged to the longitudinal edges of the chute 59 and the hinges thereof are sufficiently stiff to hold said members in upright positions. When the chute is turned upward into an inoperative position, the sides 61 are folded flat thereagainst.

What I claim is:—

1. The combination with a wagon box having pockets, of a sectional rack for the box, each section of the rack including a pair of posts, each of which comprises pivotally connected upper and lower members, both members of said posts being mounted in the pockets for endwise sliding movement to carry their pivotal connections into the pockets to hold the upper post members against pivotal movement or to withdraw said pivotal connections from the pockets to permit swinging movement of the upper post members, and means for holding the upper post members in certain pivoted positions.

2. The combination with a wagon box having pockets, of a sectional rack for the box, each section of said rack comprising a pair of posts mounted in the pockets and having tapered edges, and bars having keeper brackets slidably connecting said bars to the posts and engageable with the tapered edges thereof to limit the sliding movement of the bars on the posts in one direction and edgewise spacing the same predetermined distances apart.

3. The combination with a wagon box having pockets, of a rack for the box comprising side sections and an end section, each of which comprises pivotally connected upper and lower members, both members of said posts being mounted in the pockets for endwise sliding movement to carry their pivotal connections into the pockets to hold the upper post members against pivotal movement or to withdraw said pivotal connections from the pockets to permit swinging movement of the upper post members, means for supporting the upper post members in outturned positions, side and end bars carried by the upper post members, and rod extensions slidably mounted in the rear ends of the side bars and in the ends of the end bars, the outer ends of the rod extensions in the side bars having means for detachably connecting the same to the outer ends of the rods in the end bars.

In testimony whereof I affix my signature in presence of two witnesses.

EDWARD R. COBB.

Witnesses:
 WINIFRED I. WARD,
 HARRY D. KILGORE.